United States Patent
Arndt

(10) Patent No.: US 10,123,179 B2
(45) Date of Patent: Nov. 6, 2018

(54) METHOD AND ARRANGEMENT FOR ROUTING VEHICLES IN ROAD TRAFFIC

(71) Applicant: FORD GLOBAL TECHNOLOGIES, LLC, Dearborn, MI (US)

(72) Inventor: Christoph Arndt, Moerlen (DE)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 15/154,969

(22) Filed: May 14, 2016

(65) Prior Publication Data
US 2016/0379491 A1 Dec. 29, 2016

(30) Foreign Application Priority Data
Jun. 26, 2015 (DE) ........................ 10 2015 211 910

(51) Int. Cl.
| | | |
|---|---|---|
| G08G 1/01 | (2006.01) | |
| G08G 1/09 | (2006.01) | |
| H04W 4/04 | (2009.01) | |
| G08G 1/095 | (2006.01) | |
| G08G 1/0962 | (2006.01) | |
| G08G 1/0968 | (2006.01) | |

(52) U.S. Cl.
CPC .......... *H04W 4/046* (2013.01); *G08G 1/0112* (2013.01); *G08G 1/0129* (2013.01); *G08G 1/0133* (2013.01); *G08G 1/0145* (2013.01); *G08G 1/095* (2013.01); *G08G 1/09623* (2013.01); *G08G 1/096822* (2013.01); *G08G 1/096844* (2013.01)

(58) Field of Classification Search
CPC ............ H04W 4/046; G08G 1/096844; G08G 1/096822; G08G 1/09623; G08G 1/095; G08G 1/0133; G08G 1/0129; G08G 1/0122; G08G 1/0145
See application file for complete search history.

(56) References Cited

U.S. PATENT DOCUMENTS 7,818,125 B2   10/2010   Hatano et al.

FOREIGN PATENT DOCUMENTS

| DE | 10 2010 043 719 A1 | 5/2012 |
|---|---|---|
| DE | 10 2013 200 381 A1 | 7/2014 |
| JP | 2001033265 A | 2/2001 |
| JP | 2008241507 A | 10/2008 |
| WO | 2006070583 A1 | 7/2006 |
| WO | 2009033864 A1 | 3/2009 |

OTHER PUBLICATIONS

Examination Report dated May 13, 2016 for German Publication No. DE 10 2015 211 910.6.
http://www.verkehrsrundschau.de/staus-in-echtzeit-erkennen-so-funktioniert-google-verkehr-1378639.html, veröffentlicht am (released on) Jul. 28, 2014 (abgerufen am (accessed on) May 11, 2016).

*Primary Examiner* — Thomas Ingram
(74) *Attorney, Agent, or Firm* — Jennifer M. Stec; Brooks Kushman P.C.

(57) ABSTRACT

A central routing unit receives traffic-related data from vehicles that are involved in the road traffic, and transmits routing information to at least one vehicle on based on the traffic-related data that is received by the central routing unit. The central routing unit may transmit the routing information by displaying a dynamically-generated Quick Response (QR) code on at least one digital traffic sign.

14 Claims, 1 Drawing Sheet

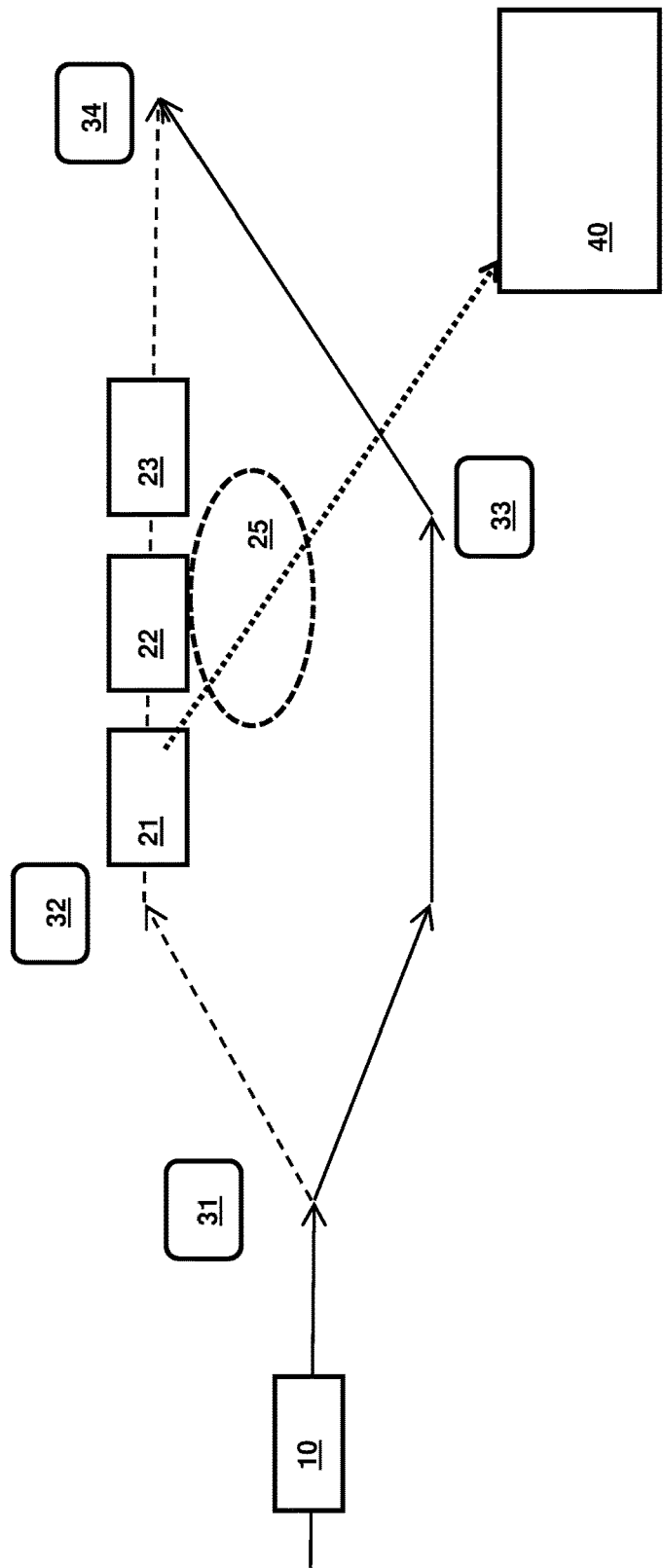

METHOD AND ARRANGEMENT FOR ROUTING VEHICLES IN ROAD TRAFFIC

CROSS-REFERENCE TO RELATED APPLICATIONS

This application claims foreign priority benefits under 35 U.S.C. § 119(a)-(d) to DE 10 2015 211 910.6 filed Jun. 26, 2015, which is hereby incorporated by reference in its entirety.

TECHNICAL FIELD

Aspects of the disclosure relate to a method and an arrangement for routing vehicles in road traffic.

BACKGROUND

During the operation of navigation devices in vehicles, the algorithm for calculating a route is triggered at the start of a journey by the respective user if it is necessary to determine the route to be travelled to the respective destination. Furthermore, the respective algorithm for calculating a route is also triggered when specific events occur, by way of example when messages regarding traffic obstructions or accident reports are received by radio. Such events or messages then lead to the optimal route being recalculated.

In addition, cloud-based solutions are known in which the time of day, the volume of traffic expected on specific stretches of road and also experience (for example traffic jams during school holidays) are taken into account.

In the above mentioned cases, the route is calculated in each case on the basis of specific trigger signals of the user or based on messages or events. As a consequence, the flexibility of the algorithms for calculating a route is limited, wherein in particular a recalculation is often delayed as a consequence of being dependent upon specific trigger signals or messages.

EP 2 201 552 B1 discloses inter alia a navigation system and a method for calculating and outputting an alternative road route in the case of warnings of traffic disruption, wherein at least one alternative road route is determined that is not affected by traffic jams and leads to rejoining an original road route.

With regard to further prior art, reference is made merely by way of example to JP 2008241507 A, JP 2001033265 A, WO 2006/070583 A1 and U.S. Pat. No. 7,818,125 B2.

SUMMARY

An object of the present invention is to provide a method and an arrangement for routing vehicles in road traffic, said method and arrangement rendering it possible to improve or optimize the traffic flow whilst quickly taking into account particular traffic situations such as traffic jams or the like.

This object is achieved by means of the method in accordance with the features of the independent claim 1 or the arrangement in accordance with the features of the independent claim 7.

A method in accordance with the invention for routing vehicles in road traffic comprises the following steps:

Receiving traffic-related data from vehicles that are involved in the road traffic by means of a central routing unit, and Transmitting routing information to at least one vehicle on the basis of the data that is received from the central routing unit.

The invention includes in particular the concept of broadening the application of traffic signs in the sense that said signs are provided with the facility of displaying (in particular dynamically-generated) Quick Response (QR) codes. The term "dynamically generating" a QR code is to be understood to mean generating a QR pattern in dependence upon a prevailing message or information (so that dynamic QR codes of this type differ in this respect from conventional static QR codes that can be read by means of an "app" or a smartphone).

Based upon these QR codes, each vehicle can be in communication with a central, in particular cloud-based, routing unit (that is used as a "central intelligent unit") and said routing unit receives information for example pertaining to the vehicle position, the destination and also vehicle parameters (for example a speed restriction as a consequence of a trailer, a weight restriction and/or height restriction owing to the vehicle size etc.).

This central information processing unit or routing unit tracks all vehicles and thus determines the volume of traffic on the segments of road that in each case are located between traffic signs that are embodied so as to display QR codes and follow one after the other. In this manner, information regarding real-time volume of traffic per segment of road is received (for example the number of vehicles, the average vehicle speed or the vehicle types that are present on the relevant segment of road) so that delays in processing or calculating the route can be avoided such as delays that occur when using TMC services or radio messages.

The traffic signs that are provided with the facility of displaying QR codes are used for the purpose of producing the contact with the central routing unit or information processing unit whereupon if required (for example in dependence upon traffic, owing to a road closure etc.) the optimal route is updated by means of a routing unit.

In accordance with the invention, the disadvantage associated with using TMC services or radio warnings is avoided, said disadvantage being that information regarding the end of a traffic situation is not broadcast in radio warnings, wherein in such cases (in other words in the case of a traffic jam that is already easing) a recalculation based upon traffic jam warnings is inappropriate and can lead to calculating a suboptimal traffic route.

A further advantage of the invention is that in accident situations or in the case of specific road conditions (for example in the case of a wet road surface, snow or ice) a more rapid engagement or a quicker reaction is rendered possible (for example in the form of information at the respective vehicle involved in the traffic while proposing a route-recalculation).

Based upon the above described information that is received, the route of each individual vehicle is calculated in the central routing unit, wherein the driver can select from multiple optimizing criteria (for example minimal distance, minimal journey time, minimal fuel consumption etc.).

As a result, in accordance with the invention the traffic flow is optimized in a central intelligent unit or routing unit. This unit can in turn be responsible for a specific region, wherein a handshake with cloud-based routing units of neighboring regions (similar to a Global System for Mobile communication (GSM) network) can occur.

The exchange of information between a vehicle and the central information processing unit or routing unit can take a period of time after which the vehicle has already passed the respective traffic sign that is displaying the QR code. The route calculation is therefore preferably performed for the next possible node and/or the next possible segment of road.

As a consequence, the calculation that is performed by the information processing unit or routing unit preferably includes a prediction in order to guide the vehicles in each case onto the optimal segments of road and to provide a stable routing of individual vehicles.

In accordance with one embodiment, the routing information is transmitted by means of displaying a dynamically-generated QR code on at least one digital traffic sign.

In accordance with one embodiment, the central routing unit is designed so as to access a virtual storage device (cloud).

In accordance with one embodiment, the traffic-related data is transmitted from the vehicles that are involved in the road traffic to the central routing unit by way of a vehicle-specific communications interface or by way of a mobile communications device that is located in the respective vehicle.

In accordance with one embodiment, the central routing unit calculates the volume of traffic for at least one segment of road based upon the data that is received.

In accordance with one embodiment, the central routing unit calculates a future traffic situation, in particular a traffic jam situation, based upon the data that is received.

The invention further relates to an arrangement for routing vehicles in road traffic, said arrangement being configured so as to implement a method having the above-described features. Regarding advantageous embodiments of the arrangement, reference is made to the above embodiments in connection with the method in accordance with the invention.

Further embodiments of the invention are evident in the description as well as in the subordinate claims.

The invention is further explained hereunder with the aid of an exemplary embodiment with reference to the attached drawings, in which:

BRIEF DESCRIPTION OF THE DRAWINGS

The FIGURE illustrates a schematic illustration for explaining a typical scenario while implementing the method in accordance with the invention.

DETAILED DESCRIPTION

As required, detailed embodiments of the present invention are disclosed herein; however, it is to be understood that the disclosed embodiments are merely exemplary of the invention that may be embodied in various and alternative forms. The FIGURE are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Furthermore, a typical scenario while implementing the method in accordance with the invention is described with reference to the schematic illustration in the FIGURE.

In accordance with the invention, traffic signs in each case are provided with the facility of displaying QR codes, wherein in addition it is rendered possible to put the vehicles in each case in contact with a central information processing unit in the form of a cloud-based routing unit. Furthermore, in accordance with the invention, vehicle routes are distributed in nodes (according to the position of the respective traffic sign that is displaying QR codes) and segments of road (that in each case extend from a traffic sign that is displaying a QR code to the next traffic sign that is displaying a QR code). At each node, the central intelligent unit or the cloud-based routing unit (CBR) for the respective vehicle decides which route or which road should be selected by the vehicle.

In the Figure, the numerals "31", "32", "33" or "34" describe traffic signs that are provided with the facility of generating QR codes.

In accordance with the Figure, a vehicle 10 is approaching the traffic sign 31. The numerals "21", "22" or "23" describe a group of unknown vehicles that are in a traffic jam. The unknown vehicle 21 transmits corresponding information 25 regarding the traffic obstruction and also associated global positioning system (GPS) data to a central information processing unit or routing unit 40.

The traffic sign 31 signals in the illustrated scenario by way of example the message "keep right, traffic jam ahead in the left lane". The traffic sign 33 signals in the illustrated scenario by way of example the message "keep left in order to reach your destination".

In accordance with the invention, in particular in each case traffic signs that are embodied so as to display QR codes are used so as to render it possible to put vehicles into contact with a cloud-based routing unit (CBR) that is used as a central intelligent unit. For this purpose, within the respective vehicle a QR code is ascertained and decoded using image capturing algorithms.

The connection or contact of the respective vehicle with the central information processing unit or routing unit 40 can occur by way of a vehicle-specific communications interface or also by way of interfaces of mobile communications devices that are located in the vehicle (where required using flat rate network plans). For a particularly rapid ("agile") calculation of the route to be travelled, parameters are transmitted to the central routing unit 40, wherein these parameters comprise vehicle parameters, optimizing parameters for the route and also route parameters (for example, shortest route, optimal fuel consumption, quickest route etc.).

Furthermore, the connection of each vehicle 10, 21, 22, 23 to the information processing unit or routing unit 40 is produced in order to determine the volume of traffic per segment of road, in other words the number of vehicles between in each case two traffic signs that are provided with the facility of displaying QR codes. This can occur independently of a navigation procedure that is performed in the respective vehicle. In the case of implementing a navigation procedure (corresponding to a predetermined route), the volume of traffic can be predicted by the routing unit 40 as a central intelligent unit.

The information regarding the volume of traffic in the respective segments of road and also a predicted or expected volume of traffic for known segments of road owing to previously-acquired knowledge (same time-of-day, same week-day etc.) can be used for the purpose of calculating the volume of traffic per segment of road and to calculate future traffic situations or to predict traffic jam situations (wherein for example parameters such as the average speed per segment, the average time required per segment etc. are taken into account).

Furthermore, the information regarding the volume of traffic in the respective segments of road and also the expected volume of traffic for known stretches of road can be used for the purpose of optimizing the route to be travelled for each vehicle involved in the traffic using intelligent algorithms to calculate the route. Swarm algorithms or entropy-based self-organizing methods can be used. In addition, self-organizing characteristics of the algorithms can be used for the purpose of optimizing the required period of time per segment of road, the total journey time and also the fuel consumption.

Furthermore, in accordance with the invention, communications from vehicles based upon specific traffic situations, stretches of road, surrounding scenarios etc. are collected and transmitted to the routing unit 40. This can alternatively be triggered by way of vehicle sensors (in the case of a traffic jam, heavy traffic, slow speed, little road surface traction etc.) or by way of vehicle information systems (for example in the case of an accident).

In addition, in accordance with the invention a complete overview of the intended route to be travelled and over possible alternative routes to be travelled (in each case with journey time, fuel consumption, road closures etc.) can be provided.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for routing vehicles in road traffic, comprising:
   receiving, by a central routing unit, traffic-related data from vehicles involved in the road traffic; and
   transmitting routing information to at least one vehicle based on the traffic-related data that is received by the central routing unit by displaying a dynamically-generated Quick Response (QR) code on a digital traffic sign, the QR code displayed to put the vehicles in contact with the central routing unit.

2. The method of claim 1, further comprising accessing a virtual storage device by the central routing unit.

3. The method of claim 1, wherein the traffic-related data is transmitted from the vehicles that are involved in the road traffic to the central routing unit by way of a vehicle-specific communications interface or by way of a mobile communications device that is located in the respective vehicle.

4. The method of claim 1, further comprising calculating, by the central routing unit, a volume of traffic for at least one segment of road based on the traffic-related data that is received.

5. The method of claim 1, further comprising predicting, by the central routing unit, a future traffic jam situation based on the traffic-related data that is received.

6. A system comprising:
   at least one digital traffic sign; and
   a central routing unit programmed to:
   receive traffic-related data from vehicles involved in road traffic; and
   transmit routing information to at least one vehicle based on the traffic-related data that is received by the central routing unit by displaying a dynamically-generated Quick Response (QR) code on the at least one digital traffic sign to put the vehicles in contact with the central routing unit.

7. The system of claim 6, wherein the central routing unit is further programmed to access a virtual storage device by the central routing unit.

8. The system of claim 6, wherein the traffic-related data is transmitted from the vehicles that are involved in the road traffic to the central routing unit by way of a vehicle-specific communications interface or by way of a mobile communications device that is located in the respective vehicle.

9. The system of claim 6, wherein the central routing unit is further programmed to calculate a volume of traffic for at least one segment of road based on the traffic-related data that is received.

10. The system of claim 6, wherein the central routing unit is further programmed to predict a future traffic jam situation based on the traffic-related data that is received.

11. A system comprising:
    an information controller programmed to
    track vehicles along segments of road;
    determine real-time volumes of traffic per each segment of road; and
    for each segment of road, provide a real-time volume of traffic for the segment of road to a traffic sign located along and corresponding to the segment of road, the traffic sign displaying a dynamically-generated Quick Response (QR) code to put the vehicles in contact with the information controller.

12. The system of claim 11, wherein the controller is further programmed to maintain the real-time volumes of traffic per each segment of road in a cloud-based storage.

13. The system of claim 11, wherein the controller is further programmed to receive traffic-related data from the vehicles, and use the received traffic-related data to track the vehicles along the segments of road.

14. The system of claim 13, wherein the traffic-related data includes global positioning system (GPS) location information indicating locations of the vehicles along the segments of road.

* * * * *